United States Patent [19]

Ohmura

[11] Patent Number: 5,666,207
[45] Date of Patent: Sep. 9, 1997

[54] IMAGE PROCESSING APPARATUS

[75] Inventor: Hiroshi Ohmura, Inagi, Japan

[73] Assignee: Canon Kabushiki Kaisha, Tokyo, Japan

[21] Appl. No.: 428,844

[22] Filed: Apr. 25, 1995

Related U.S. Application Data

[63] Continuation of Ser. No. 226,107, Apr. 11, 1994, abandoned, which is a continuation of Ser. No. 760,965, Sep. 17, 1991, abandoned.

[30] Foreign Application Priority Data

Sep. 20, 1990 [JP] Japan ............................ 2-248726

[51] Int. Cl.$^6$ ............................................. H04N 1/40
[52] U.S. Cl. ........................... 358/500; 358/448; 358/452
[58] Field of Search ............................ 358/75, 80, 443, 358/444, 468, 488, 500, 501, 448, 452

[56] References Cited

U.S. PATENT DOCUMENTS

| | | | |
|---|---|---|---|
| 4,937,662 | 6/1990 | Matsunawa et al. | 358/80 |
| 4,959,669 | 9/1990 | Haneda et al. | 358/80 |
| 5,016,096 | 5/1991 | Matsunawa et al. | 358/75 |
| 5,028,991 | 7/1991 | Sekizawa et al. | 358/75 |
| 5,091,789 | 2/1992 | Haneda et al. | 358/75 |
| 5,113,248 | 5/1992 | Hibi et al. | 358/80 |
| 5,113,252 | 5/1992 | Horie et al. | 358/448 |
| 5,132,786 | 7/1992 | Ishiwata | 358/75 |
| 5,335,095 | 8/1994 | Kageyama et al. | 358/500 |

*Primary Examiner*—Leo Boudreau
*Assistant Examiner*—Rafael Bacares
*Attorney, Agent, or Firm*—Fitzpatrick, Cella, Harper & Scinto

[57] ABSTRACT

In an image processing apparatus for subjecting a desired image processing area of an original to desired processing to obtain an output image, it is so arranged that the desired area is bounded by a line of a color corresponding to the type of processing. This is read into the apparatus, which is then made to execute copying processing.

21 Claims, 17 Drawing Sheets

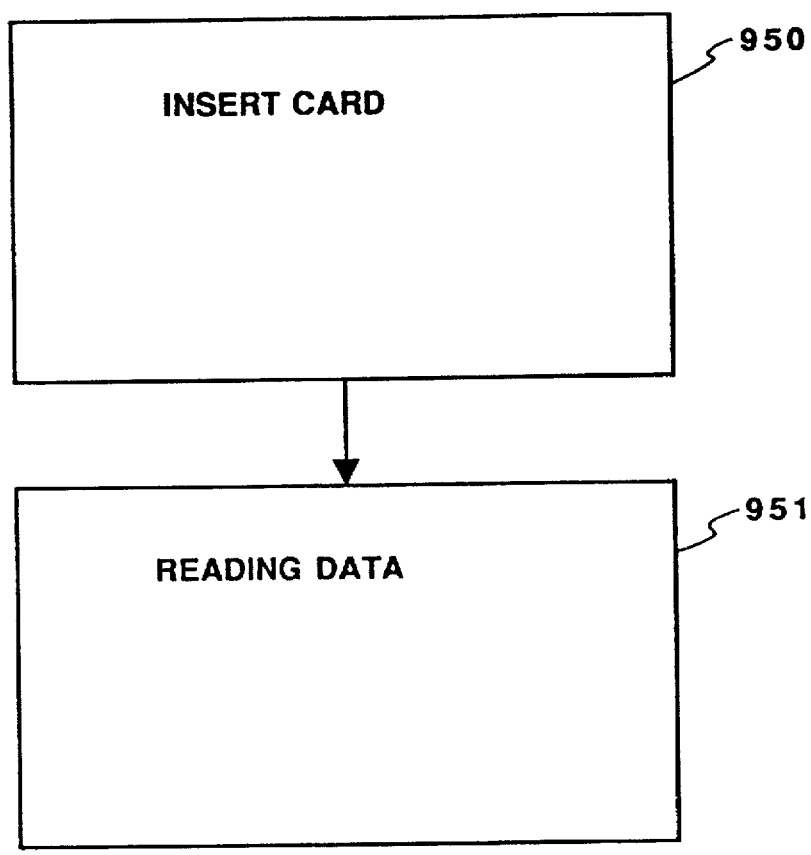
F I G. 12A
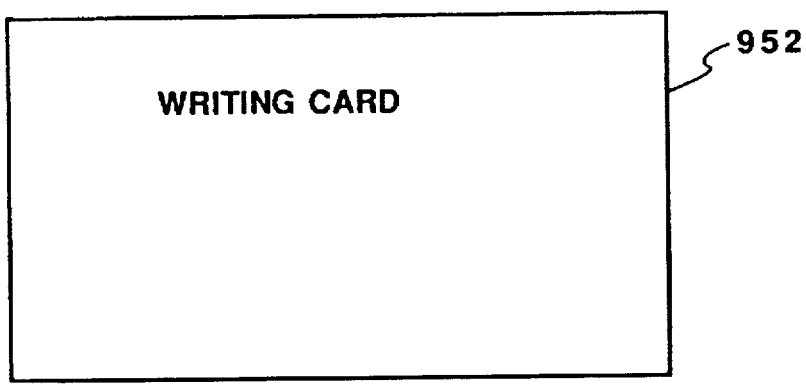
F I G. 12B

IMAGE PROCESSING APPARATUS

This application is a continuation of application Ser. No. 08/226,107 filed Apr. 11, 1994, now abandoned, which is a continuation of application Ser. No. 07/760,965 filed Sep. 17, 1991, now abandoned.

BACKGROUND OF THE INVENTION

This invention relates to an image processing apparatus for reproducing the image of an original document.

In a digital copier, for example, the conventional method for producing an image of an original is to irradiate the original with a lamp such as a halogen lamp and convert the reflected light into electricity using an element such as a charge-coupled device (CCD). After the conversion into a digital signal is made and prescribed processing is performed, an image is formed using a recording device such as a liquid-crystal printer, a thermal printer or an ink-jet printer.

A digital copier of this type has a color recognition circuit for recognizing specific colors of an image from read image information. After the colors have been recognized, image processing such as masking and trimming is executed using the recognition information, and an image is formed by the recording device.

In the example of the prior art described above, however, after colors are recognized, at best only one type of predetermined image processing, such as trimming or masking, is selected for application to the recognized areas. Thus a problem arises that the processing capable of being applied is limited.

Furthermore, when processing is applied to a desired area, the operator must take the trouble to set the processing for inside or outside the area using a control panel.

In addition, a problem arises in a case where an area is designated as by a digitizer or the like and a certain type of processing for this area is designated from a control panel. Specifically, when a plurality of areas are designated, it is difficult to grasp which type of processing has been designated for which area, and it is difficult to recognize this from the recorded results.

Moreover, though it is possible to store the settings for each area in a mode memory, settings stored in the mode memory cannot be combined.

SUMMARY OF THE INVENTION

Accordingly, an object of the invention is to provide an image processing apparatus in which an operator designates, by color, a portion of an original that is to be processed, thereby making it possible to realize the desired processing.

According to one aspect of the present invention, the foregoing object is attained by providing an image processing apparatus for reading an image of an original, forming an output image based upon the read image, and delivering the output image, comprising setting means for setting a color and details of image processing corresponding to the color set, recognition means for recognizing a color of a read image, decision means for comparing and judging the color recognized by the recognition means and the color set by the setting means, and control means for performing control, in dependence upon a judgment rendered by the decision means, in such a manner that the image processing set by the setting means is executed.

According to another aspect of the present invention, there is provided an image processing apparatus for reading an image of an original, forming an output image corresponding to the read image, and delivering the output image, comprising memory means for storing plural sets of colors and image processing corresponding to these colors, designating means for designating a desired set from among the sets stored in the memory means, recognition means for recognizing a color of a read image, decision means for comparing and judging the color recognized by the recognition means and a color designated by the designating means, and control means for performing control, in dependence upon a judgment rendered by the decision means, in such a manner that image processing designated by the designating setting means is executed.

According to another aspect of the present invention, there is provided an image processing apparatus for reading an image of an original, forming an output image corresponding to the read image, and delivering the output image, comprising a plurality of image processing means, first setting means for setting sets of colors and image processing corresponding to these colors, designating means for designating at least one set from among the sets that have been set by the first setting means, and control means for performing control in such a manner that an area, on the read image of the original, bounded by a color of a set designated by the designating means is subjected to image processing corresponding to this color.

According to another aspect of the present invention, there is provided an image processing apparatus for reading an image of an original, forming an output image corresponding to the read image, and delivering the output image, comprising image processing means for applying processing which differs for every color, reading means for reading an original image which is a desired portion bounded by a line of a desired color, and control means for performing control in such a manner that the area bounded by the line of the desired color in the image read by the reading means is subjected to image processing corresponding to the color of this line.

Another object of the present invention is to provide a registration method and an image processing apparatus which make it possible to register various modes by simple operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12A is a diagram showing the transition of screens when registering colors and the details of processing in a third embodiment;

FIG. 12B is a diagram showing a screen which prevails when writing registered data on a card in the third embodiment.

DESCRIPTION OF THE PREFERRED EMBODIMENTS

Embodiments of the present invention will now be described in detail with reference to the accompanying drawings.

Figure 1A:
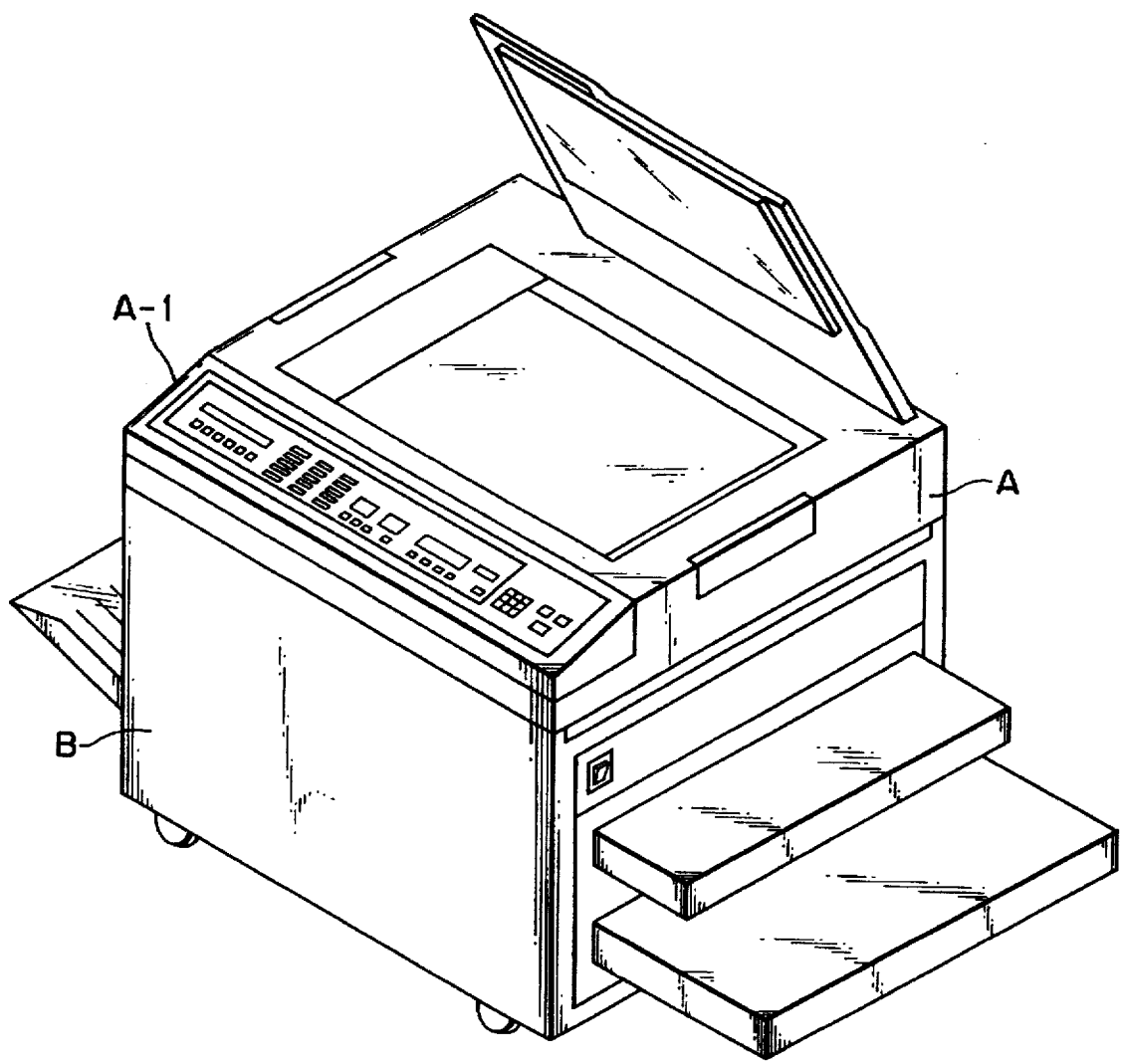
FIG. 1A is an external perspective view showing a copier according to an embodiment of the present invention.

An external view of a copier embodying the present invention is illustrated in FIG. 1A.

Figure 1B:
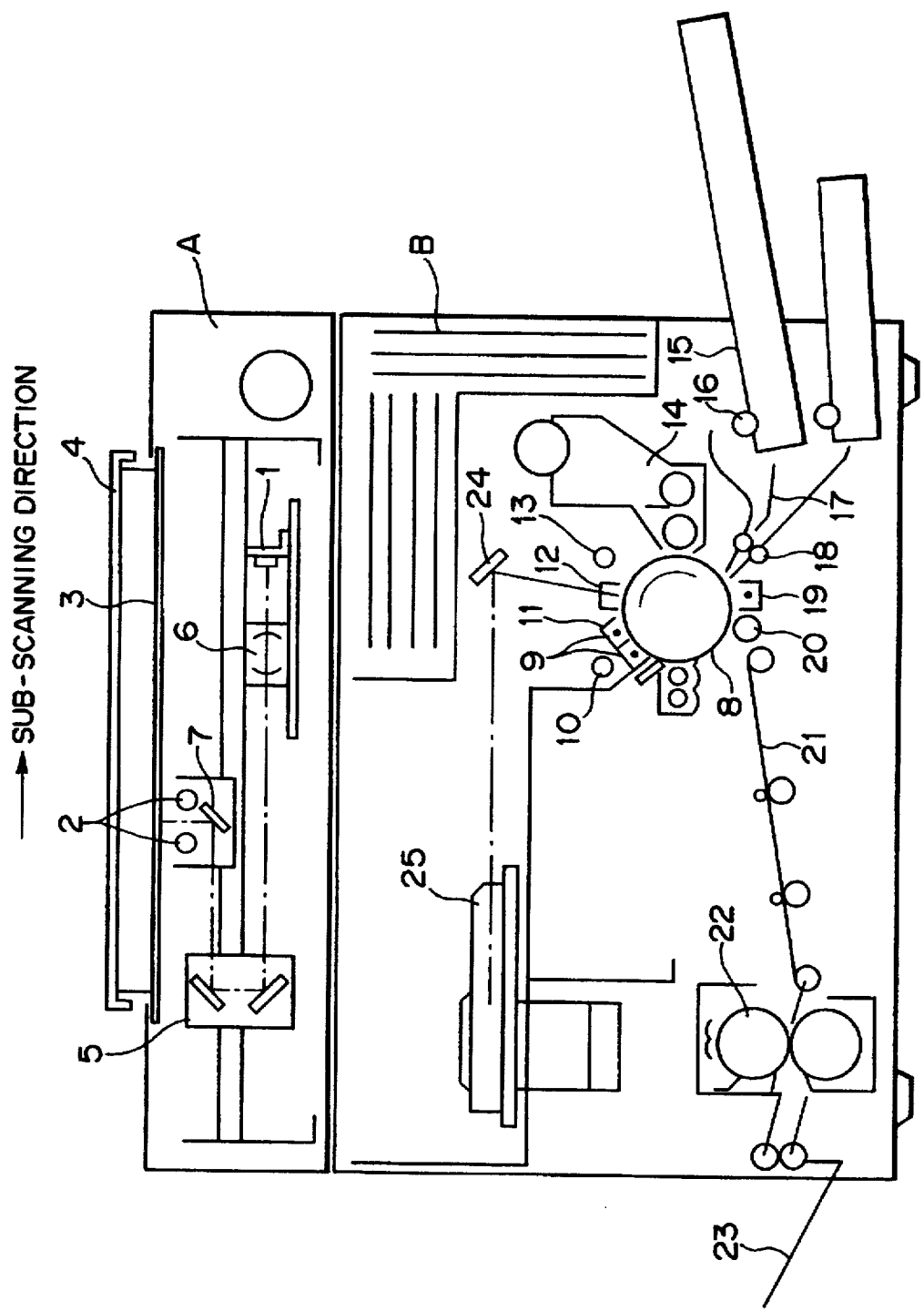
FIG. 1B is a sectional view showing the copier according to the embodiment.

The copier of the illustrated embodiment comprises two units, namely a reader A for reading an original and a printer B for reproducing an image of the original on a recording medium (recording paper). The reader A is provided with a control panel A-1. FIG. 1B is a sectional view showing the reader A and printer B. The original is placed face down upon a glass platen 3 and is pressed against the platen by a document cover 4. The original is irradiated by a fluorescent lamp 2, and light reflected from the original is reflected by mirrors 5, 7 and condensed on a CCD 1.

The mirror 7 travels at a speed twice that of the mirrors 5. This optical system is moved back and forth at a constant speed by a DC motor while control using a PLL is applied. The traveling speed is 130 mm/sec in one direction (from left to right in the drawing) when magnification is 1:1, and 800 mm/sec in the return direction (from right to left) irrespective of magnification. The maximum size of the original capable of being processed is A3, and the resolution is 400 dpi (dots/inch). Accordingly, the number of bits required for the CCD 1 is calculated as follows:

$$4678 \left( = \frac{297}{25.4} \times 400 \right) \text{ bits}$$

In this embodiment, the reader employs a 5000-bit CCD. The main scanning period is as follows:

$$352.7 \, \mu\text{sec} \left( = \frac{106}{180} \times \frac{25.4}{400} \right)$$

Figure 1C:
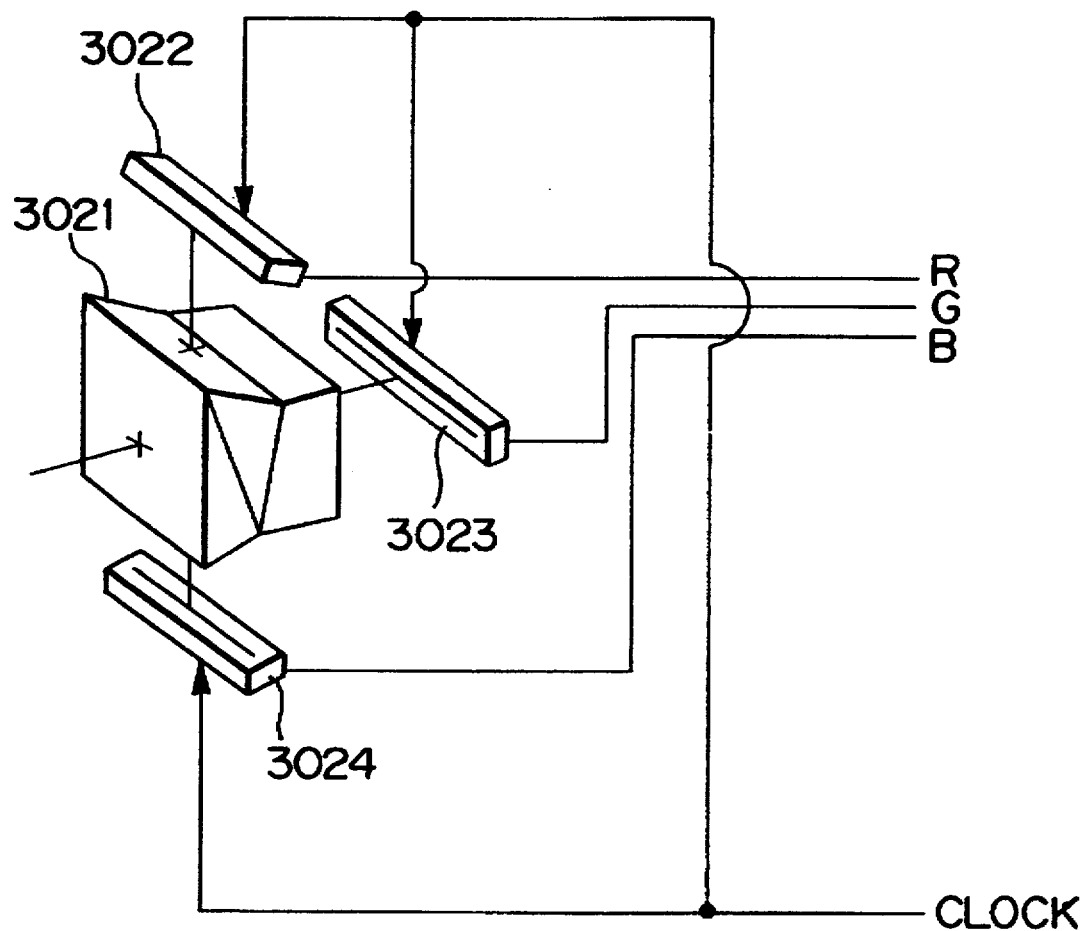
FIG. 1C is a diagram for describing the principle for reading a color image according to the embodiment.

The image of the original is subjected to line scanning by the CCD 1, whereby an image signal representing image contrast is obtained. The CCD 1, which has the construction shown in FIG. 1C, uses a three-color separating prism 3021 for separating light into the three colors R, G, B, and employs CCD sensors 3022, 3023, 3024 to read the R, G and B light beams.

The image signal, which has been processed into a bit serial by the reader A, is inputted to a laser-scanning optical unit 25 of the printer B. The optical unit 25 comprises a semiconductor laser, a collimating lens, a rotating polygonal mirror, and Fq lens, and a correcting optical system.

An image signal from the reader A is applied to the semiconductor laser, where it is subjected to an electro-optical conversion, and the resulting light beam irradiates one face of the polygonal mirror, which is rotating at a high speed, via the collimating lens. The light reflected from this mirror impinges upon a photosensitive drum 8, whereby the drum is scanned. In order to make it possible to form an image upon the photosensitive drum 8, the apparatus includes a pre-discharger 9, a pre-discharging lamp 10, a primary corona charging device 11, a secondary corona charging device 12, a flat exposure lamp 13, a developer 14, a paper feeding cassette 15, a paper feed roller 16, a paper feed guide 17, a registration roller 18, a transfer corona charging device 19, a separating roller 20, a conveyance guide 21, a fixing device 22 and a tray 23. The photosensitive drum 8 and the conveyance section travel at a speed of 180 mm/sec. The printer B is a so-called laser printer.

The copier of this embodiment possesses various "intelligent" functions for image editing and the like. Examples are variable magnification for setting any magnification in increments of 1% over a range of from 0.35x to 4.0x, a trimming function for extracting an image solely from a designated area, a move function for moving a trimmed image to any position on a sheet of paper, and a coordinate detection function for detecting positional coordinates on an original placed upon the platen 3. An arrangement for implementing these functions is well known and need not be described here.

Figure 2:
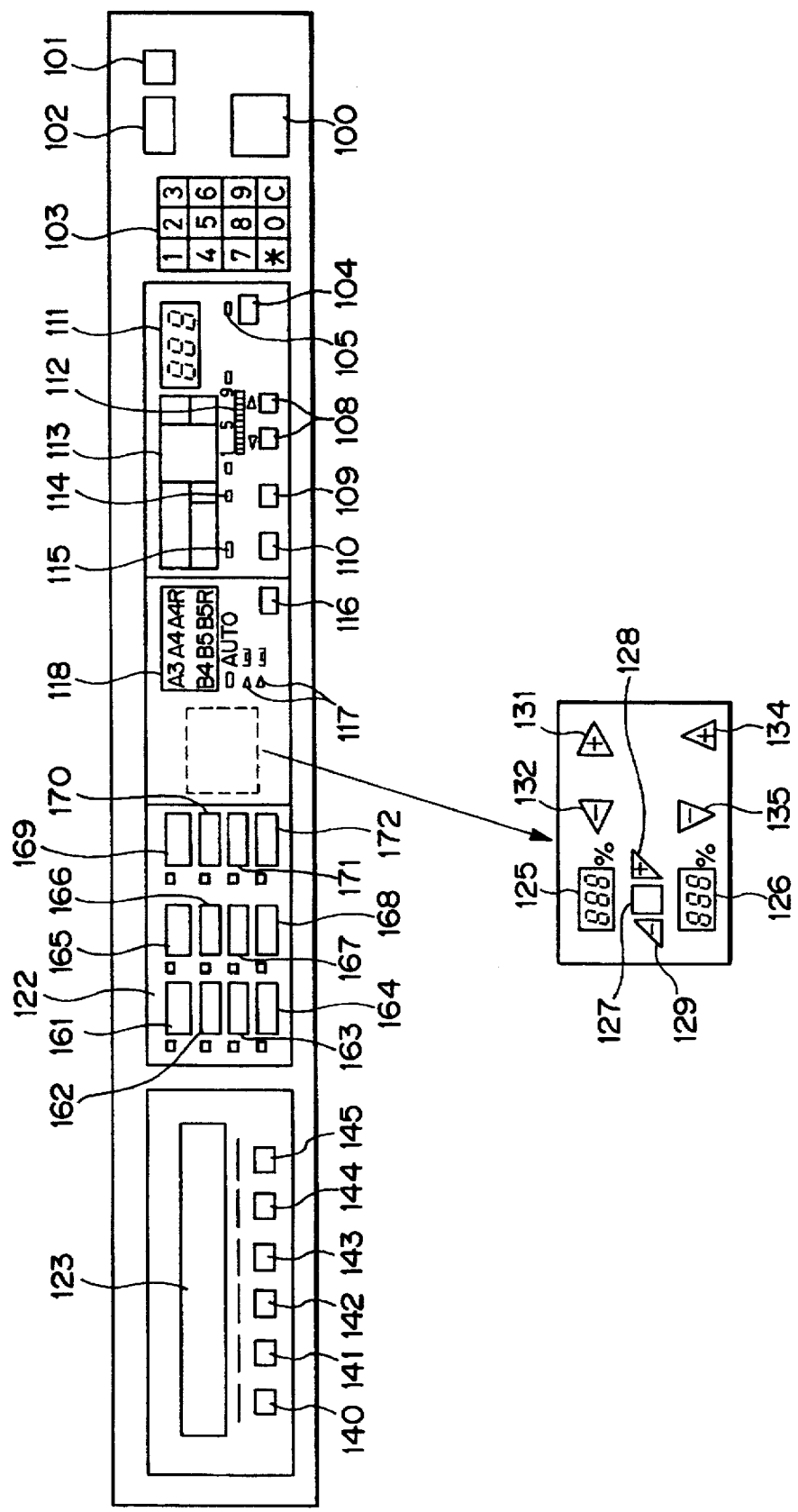
FIG. 2 is a diagram showing a control panel according to the embodiment.

FIG. 2 illustrates the details of the control panel A-1, which will now be described.

As shown in FIG. 2, the control panel A-1 includes a copy starting key 100, a copy stopping key 102, a reset key 101 for restoring the copy mode to a standard state, and a keypad 103 having a ten-key group of keys 0 to 9 for inputting the desired number of copies, a C key for clearing a designated number of copies, and a "*" key used to enter numeric data such as a trimming area. Keys 108 are for raising and lowering density. The degree of changed density is displayed on a display section 112 so that it can be confirmed. A key 104 is provided for turning on and off the function for detecting the positional coordinates of an original. A display section 105 displays the on/off state selected by the key 104. A display section 111 displays the set number of copies, and a display section 113 is for displaying various errors. A key 109 is for turning on and off a function for automatically adjusting density, and a display section 114 displays whether this function is on or off. Numeral 110 denotes a key for turning on and off a binarizing processing function (e.g., dither processing, etc.), which is for binarizing a photographic original. A display section 115 displays whether this function is on or off. Numeral 116 denotes a key which selects a paper-feed stage and an automatic paper selecting function. A display section 117 displays what has been selected, and a display section 118 displays the size of the paper selected. A display group 122 has presetting key display sections for presetting the copy mode and calling the copy mode. More specifically, a key 161 is for setting sharpness processing. Further, a key 162 is for setting color-conversion processing; a key 163 for setting slanted-image processing; a key 164 which sets processing for a shade-only-on-character mode; a key 165 which sets processing for a shade mode; a key 166 for setting bold-character processing; a key 167 for setting line-thinning processing; a key 168 for setting negative-positive reversal; a key 169 for setting contour processing; a key 170 for setting mirror-image processing; a key 171 for setting symmetric-fold processing; and a key 172 for setting smoothing processing.

A liquid-crystal display panel 123 having a touch panel includes a color-recognition registration key 140, a color-recognition processing key (No. 1) 141, a color-recognition processing key (No. 2) 142, a color-recognition processing key (No. 3) 143, a color-recognition processing key (No. 4) 144, and a color-recognition processing key (No. 5) 145.

A display section 125 displays, as a percentage, magnification MY in the sub-scanning direction, and display section 126 displays, as a percentage, magnification MX in the main scanning direction. Whenever a key 127 is pressed, a changeover is made alternately between two modes, namely a mode in which magnification MX in the main scanning direction and magnification MY in the sub-scanning direction are both made a magnification of 100%, and a mode in which both are made automatically variable (MX=MY). Keys 128, 129 are for raising and lowering MX, MY simultaneously at increments of 1%. Keys 131, 132 are for raising and lowering MX only at increments of 1%, and keys 134, 135 are for raising and lowering MY only at increments of 1%.

Figure 3:
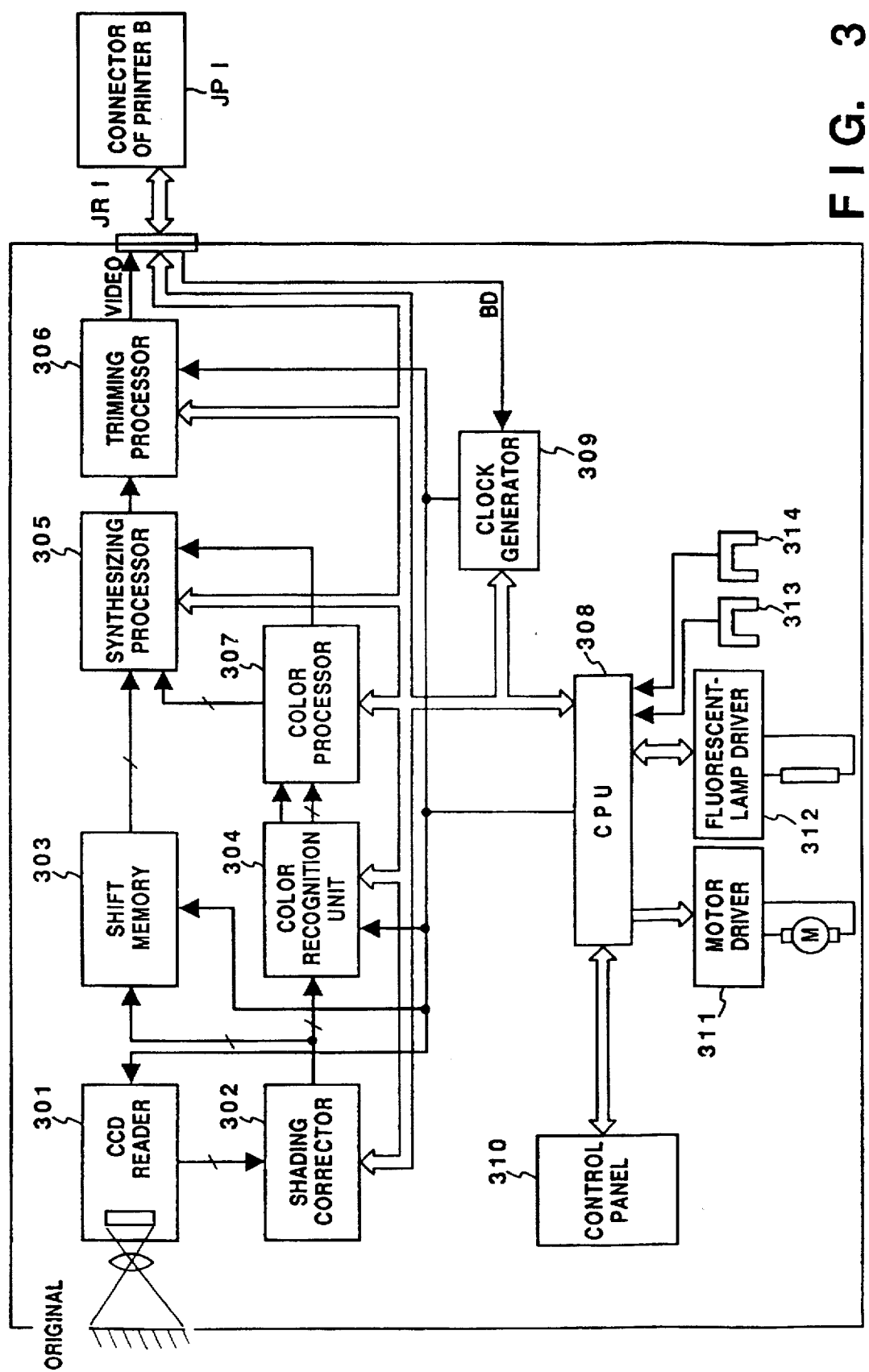
FIG. 3 is a block diagram showing a reader according to the invention.

FIG. 3 is a system block diagram of the reader A. The reader A includes a CCD reading unit 301 which internally incorporates the CCD 1, a clock driver of the CCD 1, an amplifier for the signal from the CCD 1, and an A/D converter for converting the analog output of the amplifier into a digital signal. R-, G-, B-image data, which has been converted into an eight-bit (256-tone) digital signal, is outputted by the CCD reading unit 301 and fed into a shading correction unit 302.

The shading correction unit 302 detects the amount of shading of a light source and lenses, etc., and corrects the amount of shading detected. The image signal which has undergone this processing is stored temporarily in a shift memory unit 303. The latter is provided with two lines of shift memory for each of the three color components R, G and B. The shift memory unit 303 is so adapted that while an N$^{th}$ line of image data is in the process of being written in one shift memory, the (N−1)$^{th}$ line of image data is read out of the other shift memory. The shift memory unit 303 further includes a line-address counter for writing the image data in the shift memories, a read-address counter for reading out the image data, and an address selector circuit for changing over between address signals from these two counters.

A color recognition unit 304 recognizes and detects colors registered by a control panel 310, described later. A color discrimination signal, which is indicative of the results of recognition and detection, and the image data are inputted to a color processing unit 307. The latter applies the processing registered by the control panel 310 to the registered colors, outputs the results to a synthesizing processing unit 305 and outputs also a color processing signal. The image data outputted by the memory unit 303 also is delivered to the synthesizing processing unit 305. In accordance with the color processing signal applied thereto, the synthesizing processing unit 305 decides which of the two input image signals to select, subjects the image signal decided upon to the optimum density processing for reproduction, and outputs the results to a trimming processing unit 306.

The trimming processing unit 306 forcibly makes any interval of image data on a main scanning line "0" or "1", decides whether to send the image data to a connector JP1 of the printer B, and makes it possible to edit the image.

A CPU section 308 is a well-known microcomputer constituted by a CPU, a ROM, a RAM, a timer circuit and an I/O interface. The CPU section 308 controls the control panel 310, carries out control of the reader A in dependence upon settings made by the operator, and controls also the printer B by serial communication. Numeral 311 denotes a DC servomotor driver for which speed data conforming to the magnification (magnification in the sub-scanning direction) is preset by the CPU. Numeral 312 designates a fluorescent-lamp driver for turning the fluorescent lamp 2 on and off and for controlling the quantity of light when the lamp 2 is on. Numerals 313, 314 denote position sensors which inform the CPU section 308 of the position of the optical unit.

The CPU section 308 is connected to the printer B via connectors JP1 JR1. The reader A and printer B exchange control signals necessary for image-data communication and serial communication. A well-known horizontal synchronizing signal BD is accepted from the printer B via the connector JR1, and the signal BD enters a clock generator 309. The latter produces a CCD-signal transmission clock and a read/write clock for the shift memory in synchronization with the horizontal synchronizing signal BD. In addition, the reader A accepts a size signal, which indicates the size of the paper loaded in the printer B, from the printer via the connectors JP1, JR1.

The operations of the color recognition unit and the color processing unit 307, which are principal components in this embodiment, will now be described.

First, a method of registering colors desired to be recognized in the color recognition unit 304 will be described with reference to FIG. 4.

When the color-recognition registration key 140 is pressed, a color-recognition setting screen indicated at 401 is displayed on the display panel 123 (of the touch-panel type, as mentioned earlier). At this time, an LED assigned to the key 140 lights so that the operator can verify which key has been pressed. Characters representing recognizable colors previously stored in the ROM are displayed on the screen 401. If the color (e.g., blue) desired to be recognized is touched, the screen changes to 402. If this is acceptable, a "REGISTER" key is touched, whereupon the screen 403 is displayed, followed by screen 408 in FIG. 5.

Figure 4:
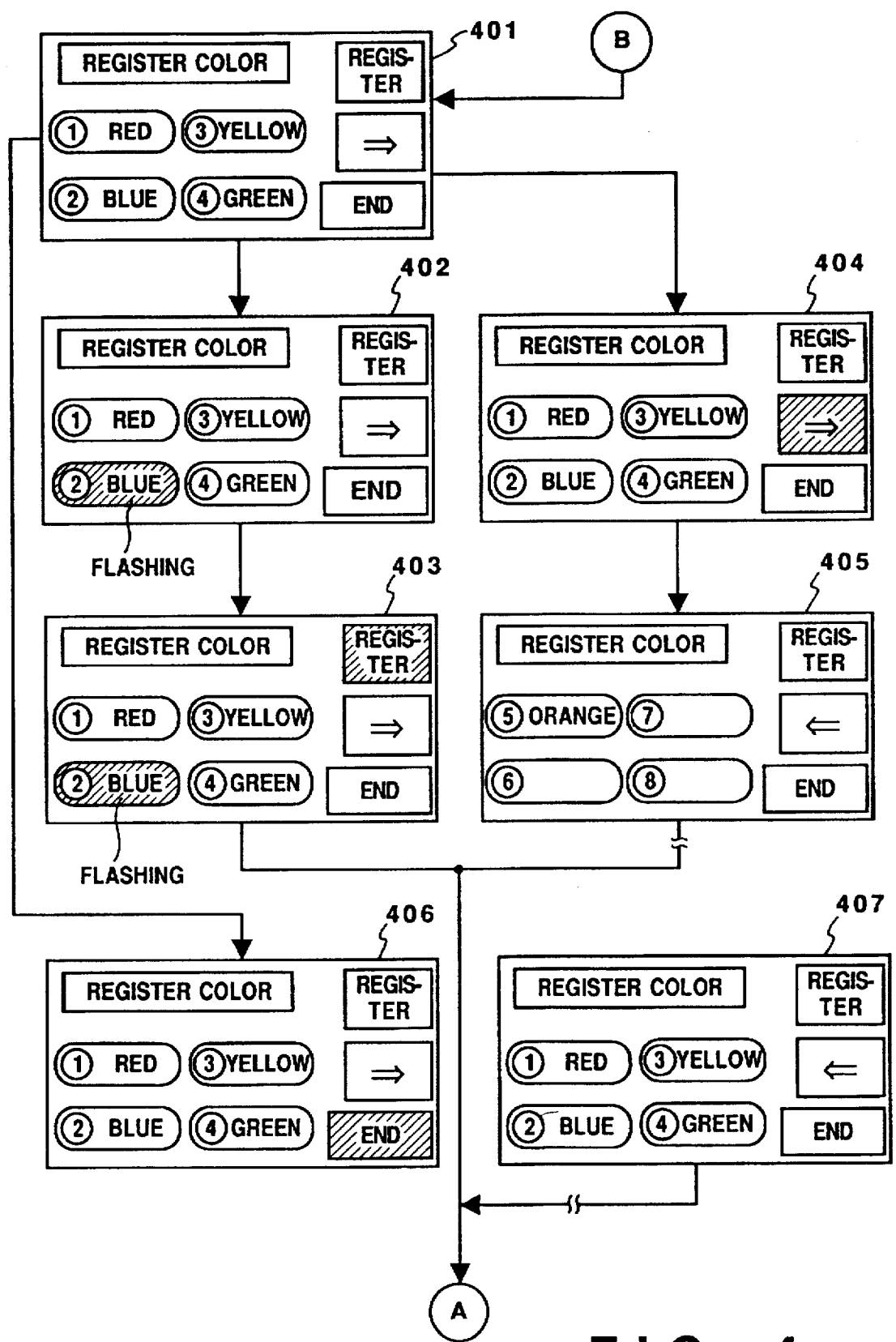
FIG. 4 is a diagram showing the transition of screens in color registration.

If "→" is touched on screen 401 in FIG. 4, the screen 404 is displayed, after which a list of colors (other than those on screen 401) that are capable of being registered is displayed, as illustrated by screen 405. When "←" is displayed, as on screen 407 in FIG. 4, this means that that there are no further colors that can be registered. The foregoing holds for screens 412, 413 in FIG. 5 as well.

If the "END" key is touched on screen 401, screen 406 is displayed, after which color registration processing for color recognition is ended.

Thus, colors that are to be recognized are registered as set forth above. Now, the contents of conversion processing for registered colors are registered.

Figure 5:
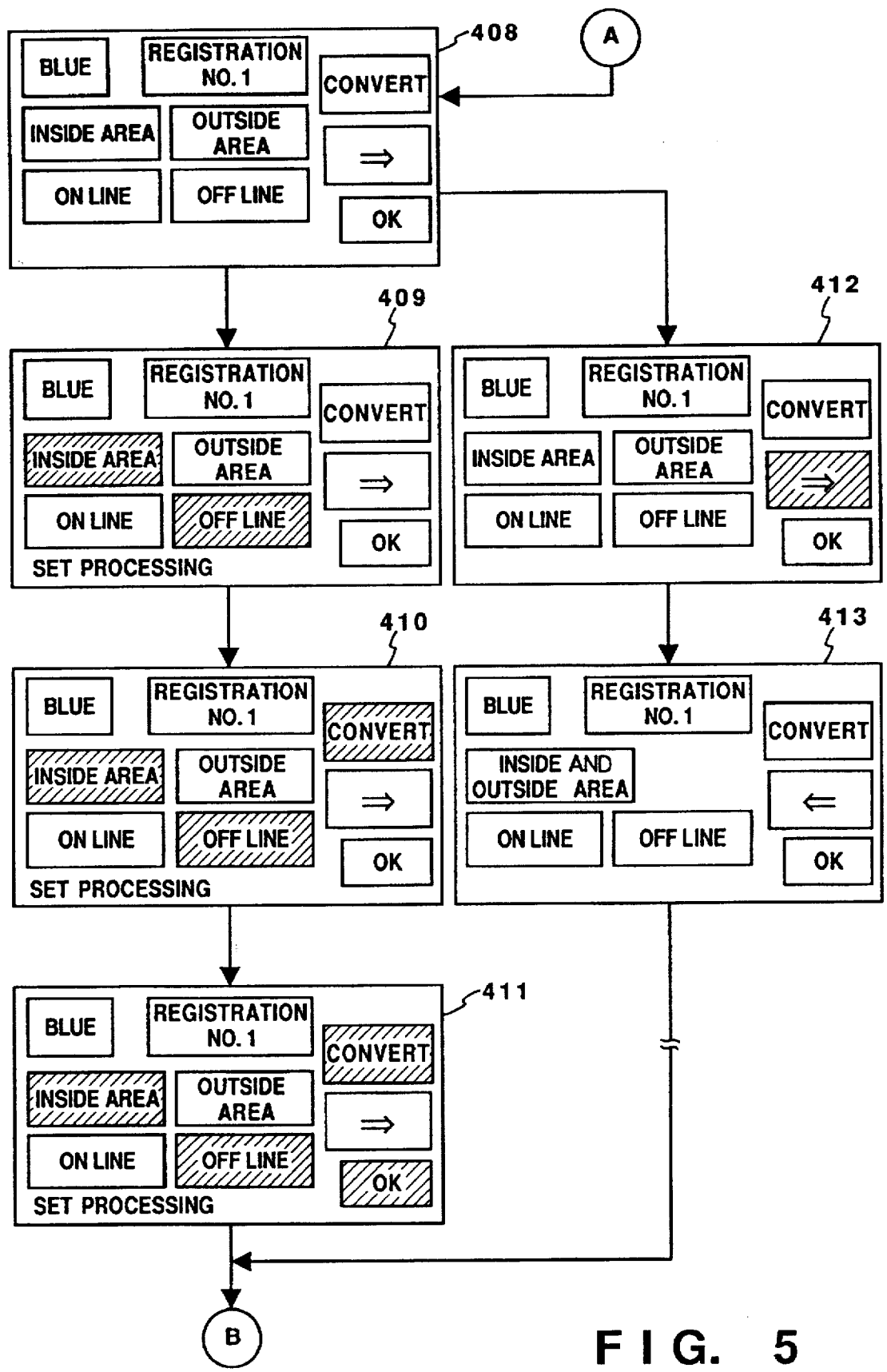
FIG. 5 is a diagram showing the transition of screens when registering the details of processing.

It should be noted that "ON LINE" on screen 408 in FIG. 5 indicates the inclusion of a color line (boundary), whereas "OFF LINE" means that the color line is not included.

If it is desired to designate the inside of an area and "off line", then "INSIDE AREA" and "OFF LINE" are touched, whereby screen 409 is displayed. When this occurs, the operator, in accordance with the message "SET PROCESS- ING" which appears on screen 409, selects the desired image-processing key from among the copy modes of the key group 122 on the control panel of FIG. 2 and presses this key to set the processing for a set area. For example, if the negative-positive reversal is desired, the key 168 is pressed. At this time, an LED alongside the key 168 lights so that it is possible to confirm that negative-positive reversal processing has been registered.

If the "CONVERT" key on screen 409 is pressed after the processing has been set, screen 410 is displayed. Then, if the "OK" key is pressed, screen 411 is displayed and screen 401 of FIG. 4 returns. Now, however, the operator is capable of confirming that "2. Blue" has been reversed, that recognition of this color has been performed, and that the processing setting has been made. If the "END" key is now pressed, screen 406 is displayed, after which color-registration processing for color recognition ends.

By repeating the foregoing procedure, processing can be decided for each of five colors red, blue, yellow, green and orange in this embodiment. In addition, if it is desired to use a first registered processing and a third registered processing from among the types of processing registered above, the operator need only press keys 141 and 143.

The outline of the overall operation will now be described.

First, the operator places the original on the platen 3 and then presses the color-recognition processing key, such as the key 141, to execute the desired processing.

In accordance with the registered processing described above, the key 141 is for negative-positive reversal processing inside a blue-colored area.

Next, the operator presses the copy starting key 100, whereby the sensor is scanned and an image signal enters the shading correction unit 302. The data resulting from the shading correction enters the shift memory unit 303 and the color recognition unit 304. The output image signal from the shift memory unit 303 is inputted to the synthesizing processing unit 305, one of the image signals from the color processing unit 307, described below, is selected, density processing optimum for reproduction is executed, and the results are sent to the printer via the trimming processing unit 306.

The operating procedure of the color recognition unit 304 will be described with reference to FIG. 6.

First, at step S101, parameters for color recognition are computed.

By way of example, parameters r, g, b are computed as follows:

$$\frac{R}{R+G+B} = r$$

$$\frac{G}{R+G+B} = g$$

$$\frac{B}{R+G+B} = b$$

where R, G, B represent the values of the color components outputted by the shading correction unit 302.

Next, at step S102, it is determined whether a recognition color and contents of processing have been registered for "No. 1", and whether the color-recognition processing key 141 has been pressed. If the answer is YES, the program proceeds to step S111, at which it is determined whether the parameters r, g, b are the No. 1 registered colors. If the decision is YES, i.e., if the pixel data on interest is determined to be the color which is the object of processing, the program proceeds to step S121, where a No. 1 discrimination signal is turned on. If the decision rendered at step S111 is NO, then the program proceeds to step S103.

Thereafter, similar processing is repeated at steps S103 through S106. If pixel data does not belong to any color, the color discrimination signal is turned off at step S107. Then, at step S108, it is determined whether the image signal has ended, i.e., whether the original has been read to the end thereof. If the answer is NO, then the program returns to step S101, the foregoing processing is executed again and the processing is terminated when a YES decision is rendered at step S108.

The operation of the color processing unit 307 will now be described.

Figure 7:
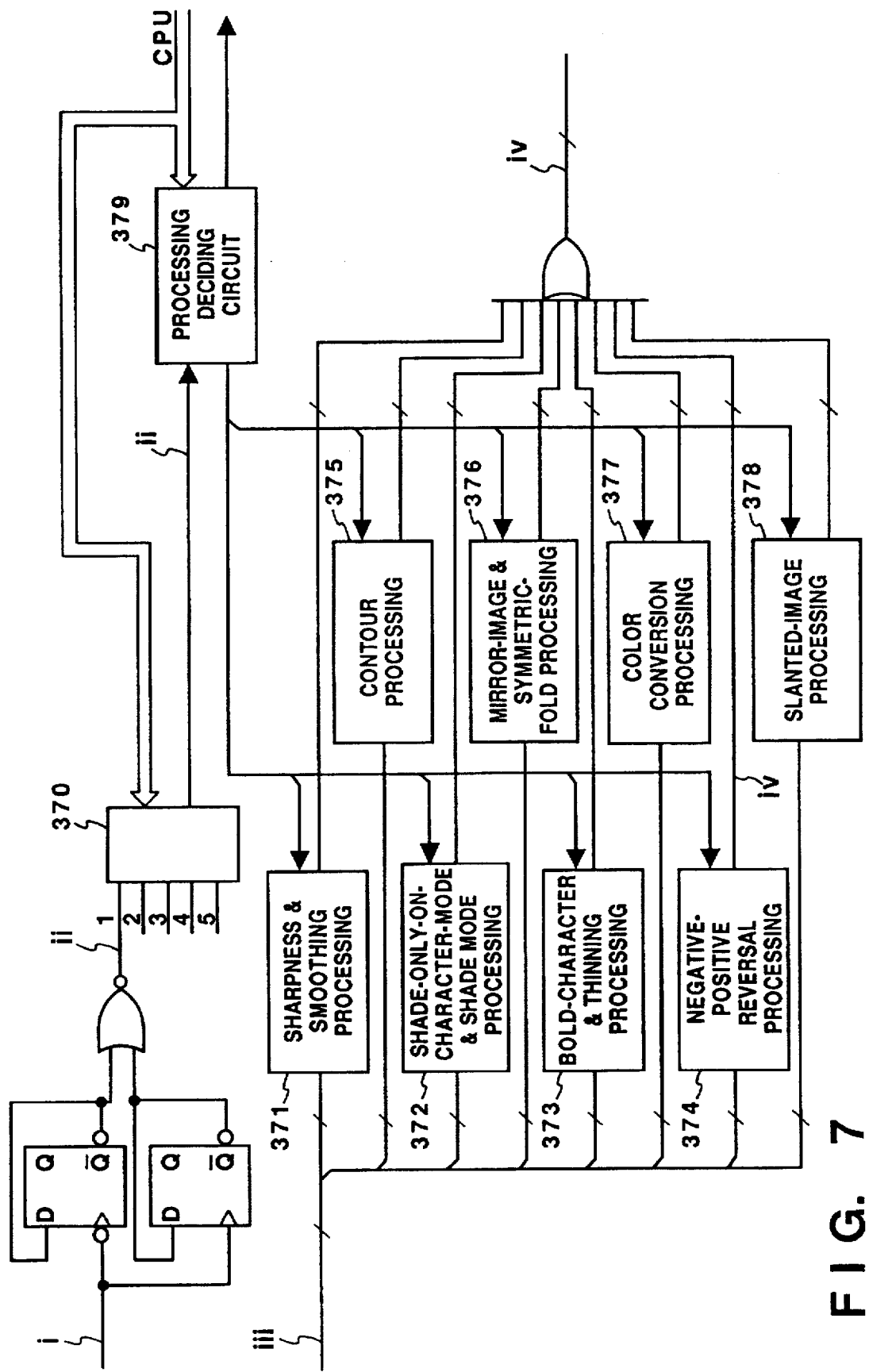
FIG. 7 is a block diagram of a color processing unit.
Figure 8A:
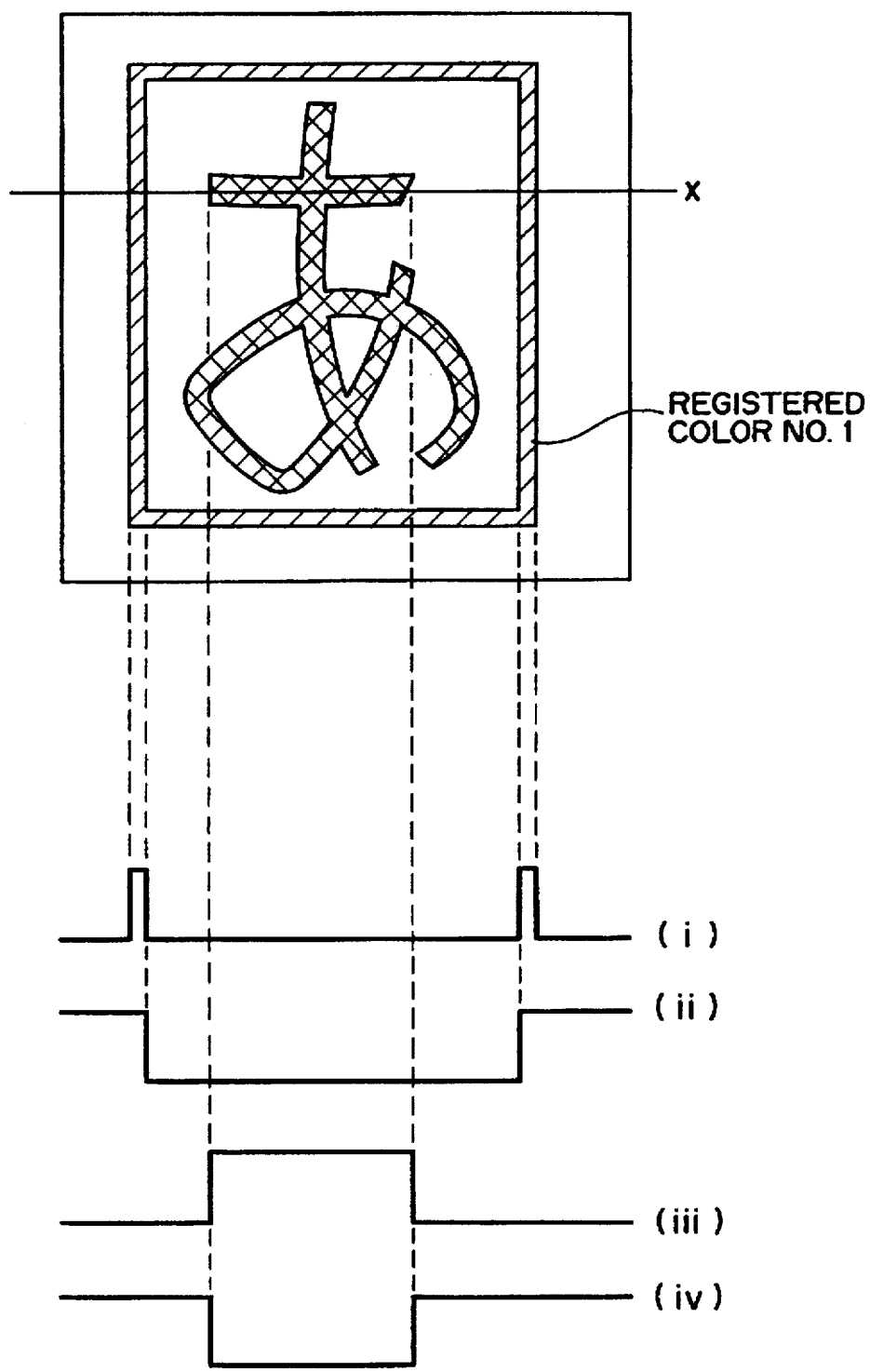
FIGS. 8A, 8B are diagrams for describing the operations performed by the color processing unit.

FIG. 7 is a block diagram showing the color processing unit 307 according to this embodiment, and FIG. 8A shows an example of an original as well as a timing chart which prevails when the original is scanned. The portion represented by the slanted lines in the original is indicative of the color blue. An example will be described in which the interior of the blue boundary (this corresponds to the case where the boundary is not included, namely that where "OFF LINE" has been designated) is subjected to a negative-positive reversal. The signals shown in the lower part of FIG. 8A are those obtained when X position on the original is read. Here i represents a discrimination signal for the No. 1 registered color; ii an area signal obtained by the inside-area, off-line setting; iii an image signal on an X line; and iv an image signal after the negative-positive reversal. Among these signals, the signals i and iii are obtained from the color recognition unit 304.

Figure 8B:
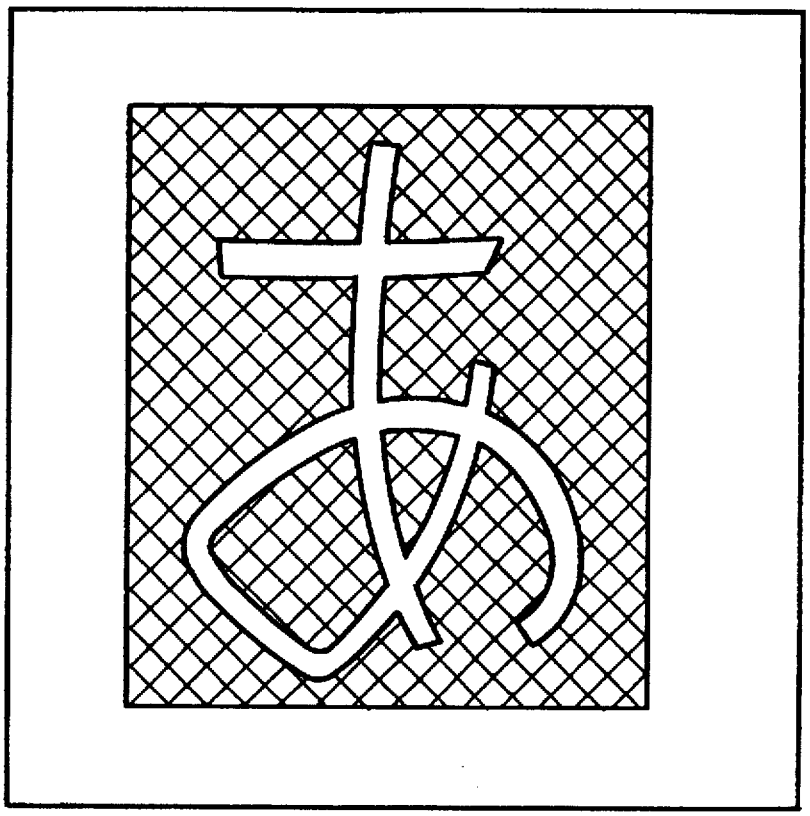

FIG. 8B illustrates an example of the reproduced image that is the result of the foregoing.

Each component shown in FIG. 7 will now be described.

As shown in FIG. 7, the input signal i in FIG. 8A is applied to flip-flops, which in combination with a gate produce the signal ii that enters a selector circuit 370. The latter decides which of five input signals is to be selected, and sends the selected signal ii to a processing deciding circuit 379. The latter selects the image processing for the selected area signal, selects the image processing set for the inputted image signal, and outputs an enable signal which enables this processing. The area signal (signal ii) is outputted to the synthesizing processing unit 305. The arrangement of FIG. 7 further includes a sharpness and smoothing processing circuit 371, a processing circuit 372 for a shade-only-on-character mode and for a shade mode, a negative-positive reversal circuit 374, a contour processing circuit 375, a mirror-image and symmetric-field processing circuit 376, a color-conversion processing circuit 377, and a slanted-image processing circuit 378.

In case of the embodiment of FIG. 8, only the negative-positive reversal circuit is operated (controlled by the CPU). The other circuits are provided with disable signals outputted by the processing deciding circuit and do not operate. When each of these other processing circuits receives a disable signal, the output of the particular processing circuit is sent to the "0" logic level.

Accordingly, the output signal of the negative-positive reversal circuit 374 is selected with regard to the image signal iii, and the output of the color processing unit 307 becomes the signal iv.

It should be noted that the negative-positive reversal circuit 374 is a look-up table constituted by a ROM or the like. When the R component, for example, is the component of interest, the data stored in this look-up table is such that the larger the R value inputted as an address, the smaller the value outputted.

Though only the negative-positive reversal processing circuit 374 is described in the foregoing embodiment, the other circuits execute well-known image processing and need not be described in detail. However, the sharpness and smoothing processing involves processing for either raising or lowering the density gradient. The processing for the shade mode involves making the background (the white portion) of a character pattern a prescribed pattern (slanted lines, etc.), and the processing for the shade-only-on-character mode involves making the line segment constituting a character pattern a prescribed pattern. The bold-character processing and the line-thinning processing involve literal thickening and thinning of line segments constituting characters. Contour processing involves extracting only the edge portion of a line segment constituting a character and making the interior of the line segment blank. Mirror-image processing is processing for flipping an image over. Symmetric-fold processing entails placing a mirror image in a state in which it is connected to the original image. Color-conversion processing converts a specific color to another color. Slanted-image processing is for slanting a character or the like.

<Description of the Second Embodiment>

In the first embodiment described above, there is a limitation upon the types and number of colors registered as shown in screen 401 of FIG. 4. In the second embodiment described below, a desired color can be registered from the reader A, and various types of processing can be set for the registered color.

Accordingly, the setting of the various types of processing for registered colors is the same as in the first embodiment and need not be described. The following description relates to the registration of desired colors, which is different from that of the first embodiment.

The method of registering a color desired to be recognized in the color recognition unit 304 will be described first.

Figure 9A:
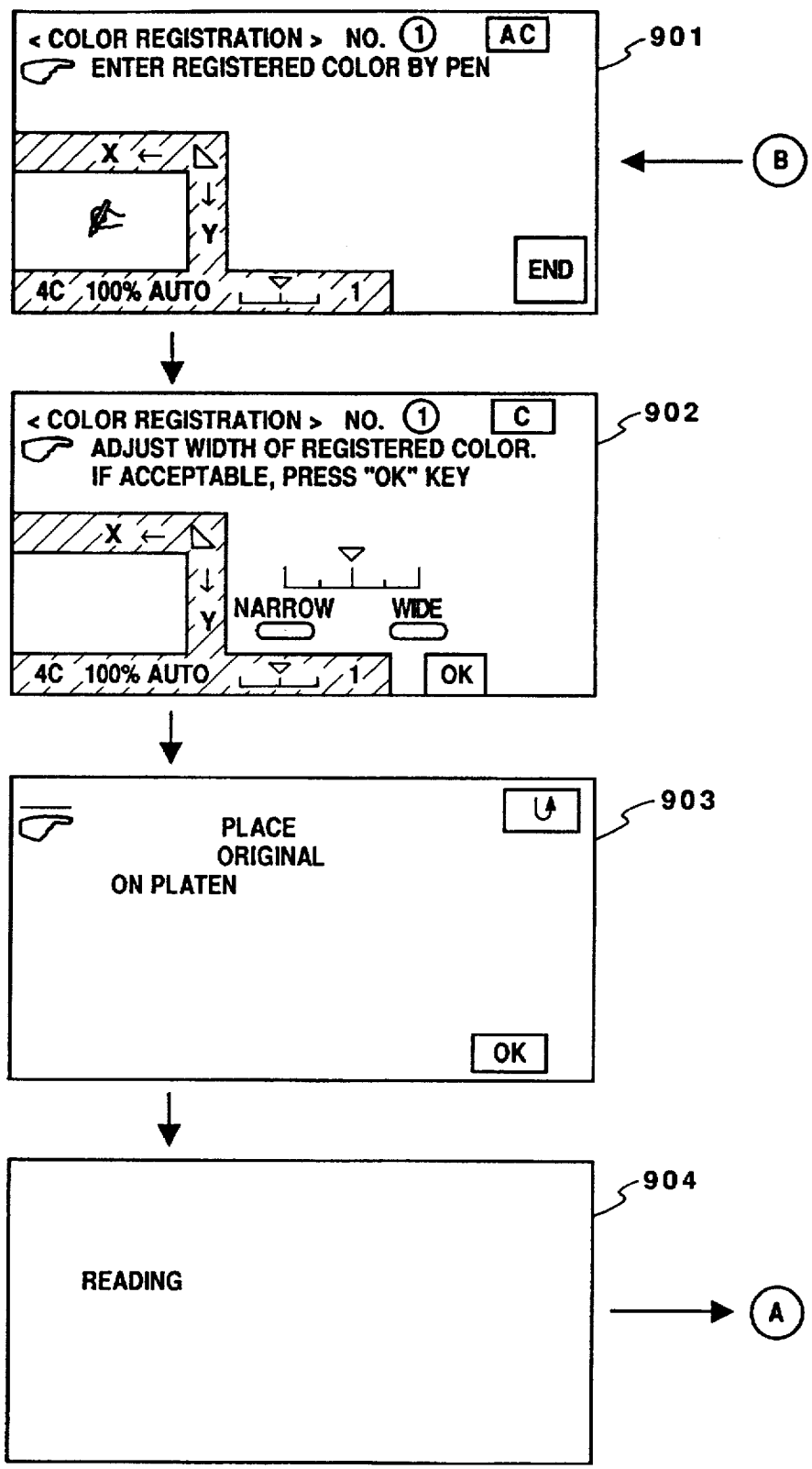
FIGS. 9A, 9B are diagrams showing the transition of screens in color registration and in the registration of the details of processing in a second embodiment.
Figure 9B:
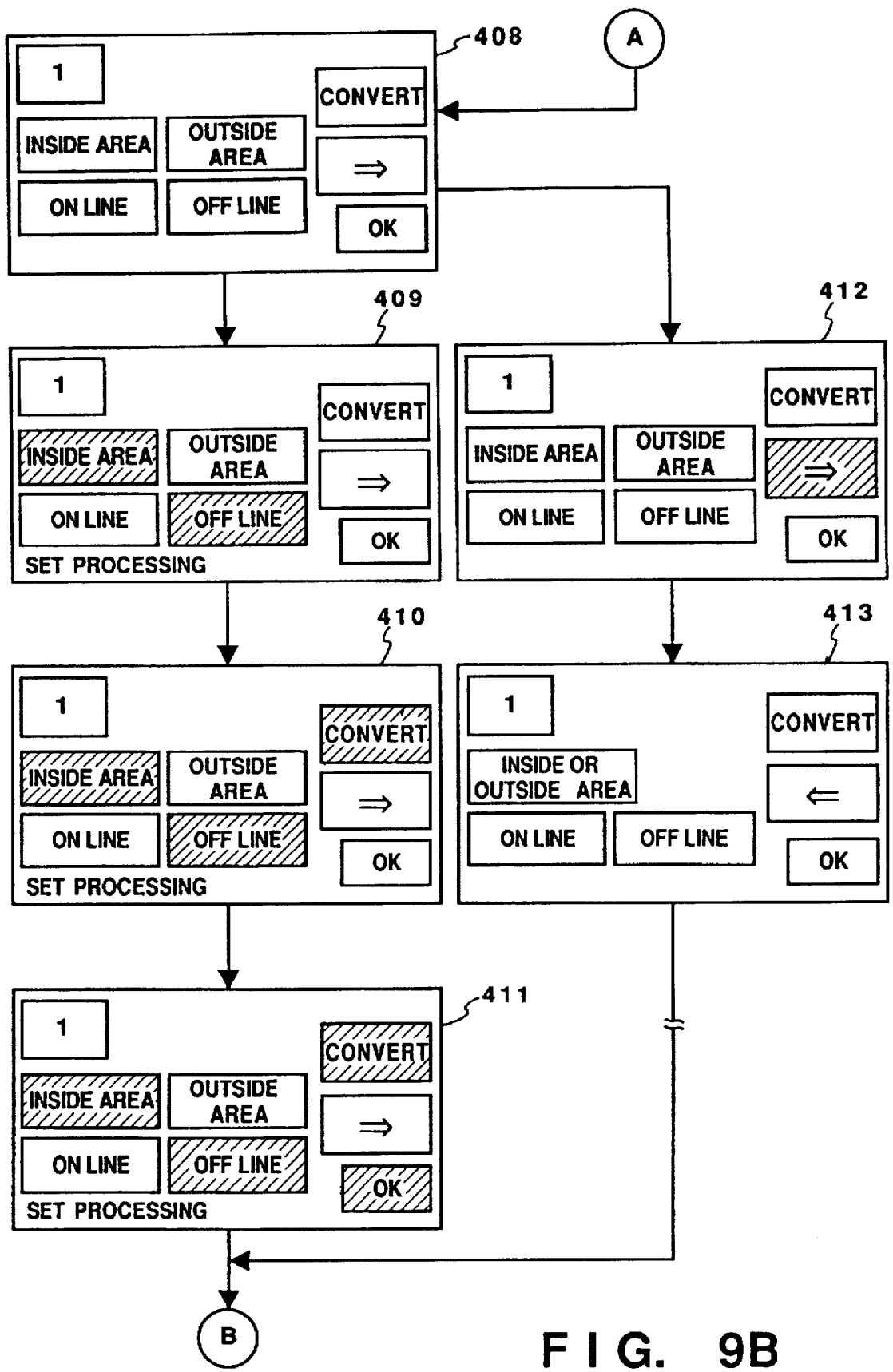

FIGS. 9A and 9B illustrate the flow of color registration processing for color recognition.

Figure 10:
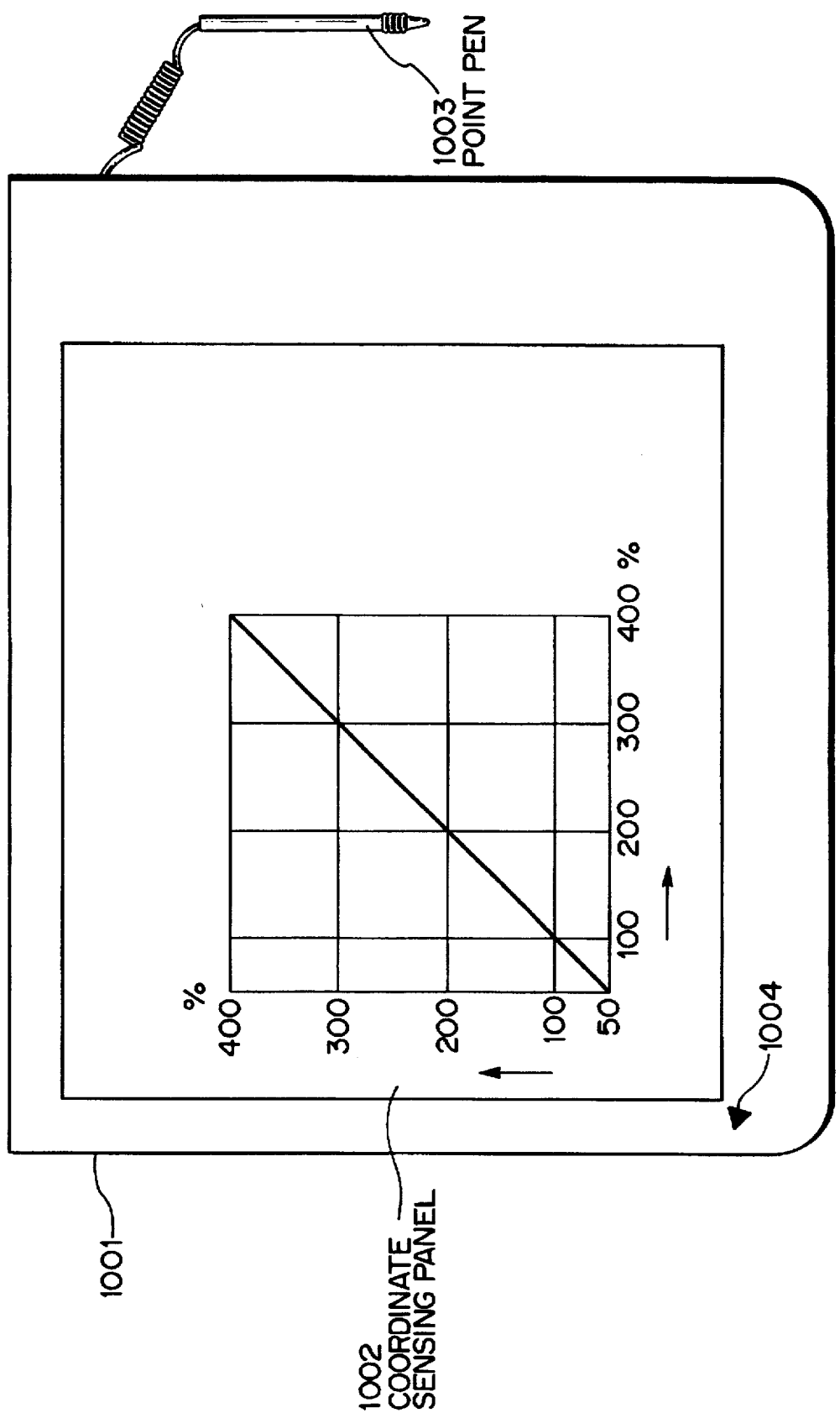
FIG. 10 is a diagram showing the external appearance of a digitizer used in color designation in the second embodiment.

When the color-recognition registration key 140 is pressed, the CPU causes the color-registration setting screen shown at numeral 901 in FIG. 9A to be displayed on the touch panel 123. The original whose colors are to be registered is faced upward and set at the lower-left corner (the corner indicated by the mark 1004) of a digitizer 1001 illustrated in FIG. 10. Next, one point in a colored portion of the original desired to be registered is pressed by a point pen 1003. As a result, the coordinates of the position so designated are read in. The screen then changes from 901 to 902. If necessary, the width of the registered color is adjusted. In a case where it is desired to register colors closely resembling one another, a "WIDE" key is pressed to enlarge the width of the color registered. If it is desired to register colors by distinguishing them from closely resembling colors, a "NARROW" key is pressed to reduce the width of the color registered. After this setting is made, an "OK" key is pressed, whereby a screen 903 is displayed.

Next, the original that has been placed upon the digitizer 1001 is picked up and placed face down upon the glass platen, after which the "OK" key is pressed. This starts an operation for reading related to color registration. The CPU section 308 causes the optical system to move to a position corresponding to the coordinates designated earlier, and obtains the R, G and B components of the corresponding position. In the meantime, a message is displayed, as shown on screen 904. With the end of the reading operation, a screen 408 shown in FIG. 9B is displayed. The display operation from screen 408 to screen 411 in FIG. 9B is the same as that of screen 408 to screen 411 in FIG. 5.

When the "OK" key is pressed on screen 411, the screen 901 in FIG. 9A is displayed again and the numeral on the upper portion of the display changes to "1" so that a registered color No. 2 can be set. The numeral at the upper left of the screen 408 in FIG. 9B also corresponds to the registered-color number.

Figure 11:
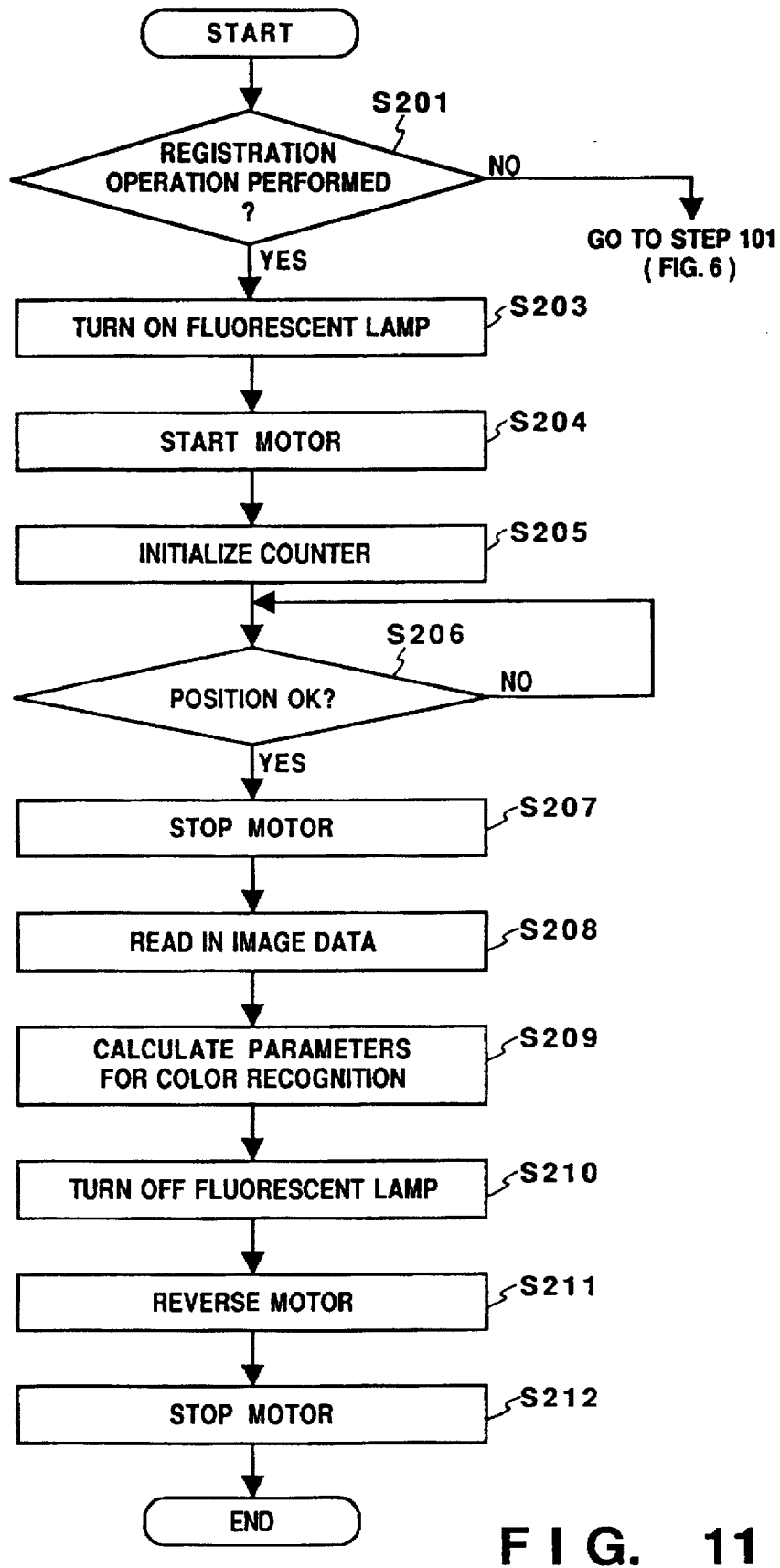
FIG. 11 is a flowchart relating to the writing of colors to be registered in the second embodiment.
Figure 13:
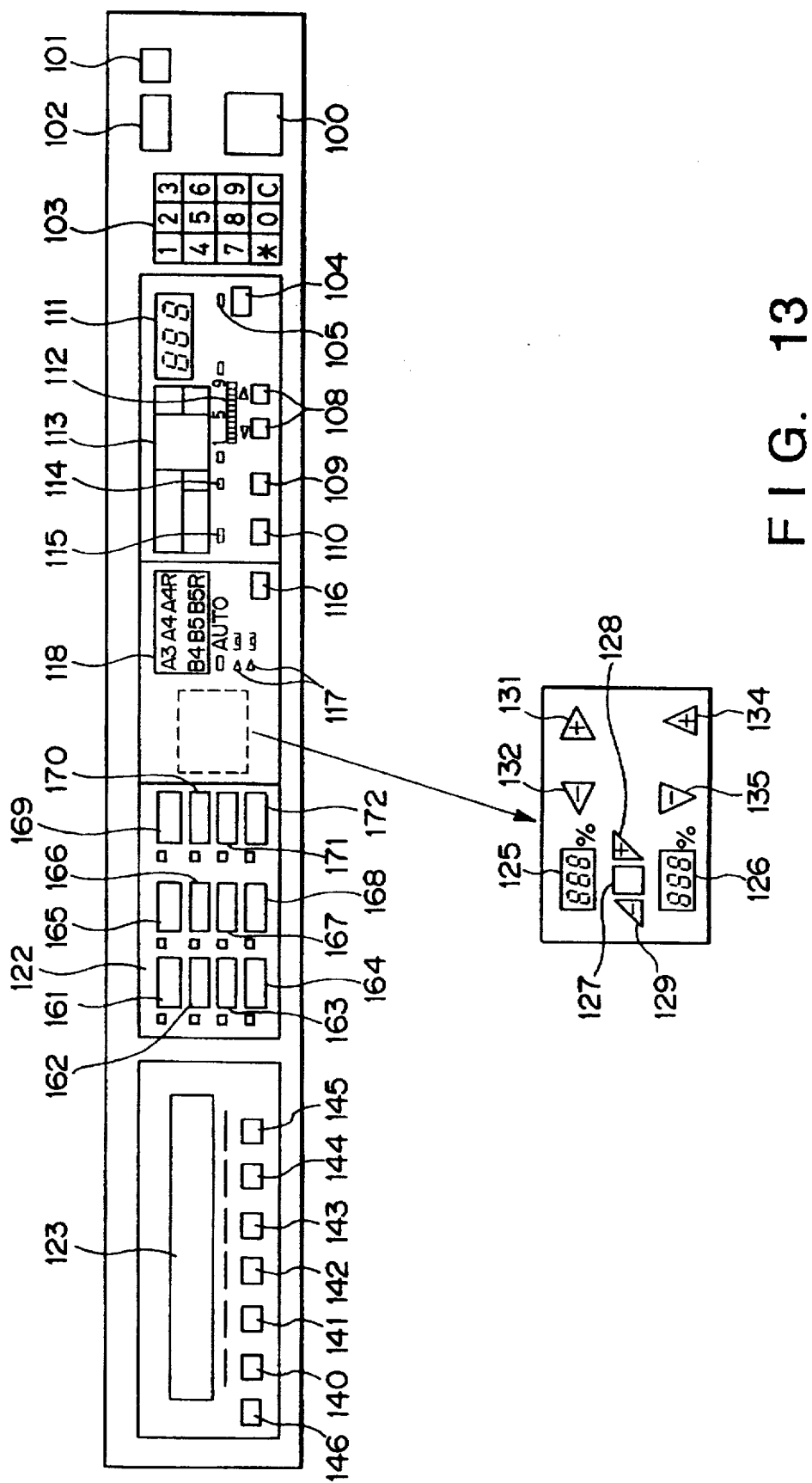
FIG. 13 is a diagram showing a control panel in a third embodiment.

The processing procedure (the operation of the color recognition unit 304) for reading in a color desired to be registered will be described in accordance with the flowchart of FIG. 11.

First, at step S201, it is determined whether the registration operation is in effect. If the answer is NO, processing starts from step S101 of FIG. 6. If the registration operation is in effect, however, the program proceeds to step S203, at which the CPU section 308 performs control in such a manner that the fluorescent-lamp driver 312 causes the fluorescent lamp to light. Next, at step S204, the CPU section 308 controls the motor driver 311 so as to scan the sensor. Then, at step S205, a read counter provided at a predetermined address position of a RAM in the CPU section 308 is initialized. The counter counts, in single-dot units, scanning in the sub-scanning direction by the CCD. It is determined at step S206 whether the counter value (the present position of the reading unit 301 in the sub-scanning direction) is the same as the coordinate, in the sub-scanning direction, designated earlier by the point pen 1003. If the counter value and the coordinate value are found to be the same, the motor is stopped at step S207 in order to halt the movement of the reading unit 301. This is followed by step S208, at which the pixel data R, G, B corresponding to the coordinate in the main-scanning direction designated by the point pen 1003 is read in from the halted reading unit 301. The parameters for color recognition are calculated from the read data at step S209. Thereafter, the CPU section 308 controls the fluorescent-lamp driver 312 so as to extinguish the fluorescent lamp at step S210. Then, at step S211, the CPU section 308 controls the motor driver 311 in such a manner that the motor is reversed to return to the home position. The motor is stopped at step S212 when it has returned to the home position.

The foregoing ends the series of registration operations.

Figure 6:
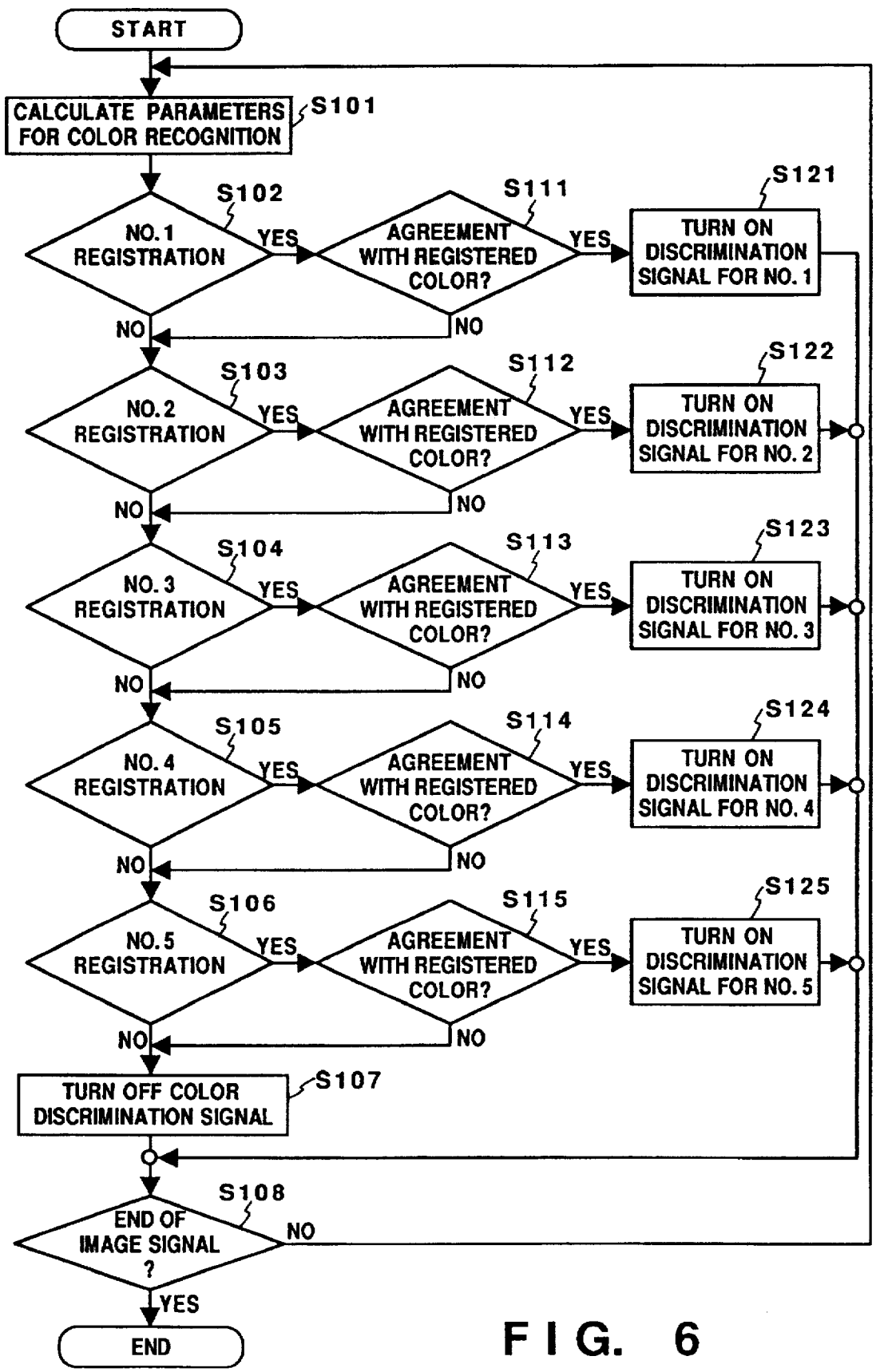
FIG. 6 is a flowchart showing the operation of a color recognition unit.

As at step S101 of FIG. 6 in the first embodiment, the following computations are performed at step S209:

$$\frac{R}{R+G+B} = r1$$

$$\frac{G}{R+G+B} = g1$$

$$\frac{B}{R+G+B} = b1$$

where the "1" of "r1" indicates registered color No. 1.

Here the width of the color on screen 902 is registered at parameter k1 (where $0 \leq k_i < 1$). The color registered becomes the following:

(1+k1)r1 from (1−k1)r1
(1+k1)g1 from (1−k1)g1
(1+k1)b1 from (1−k1)b1

At the time of registration processing, the more "WIDE" is designated, the larger the value of k1 becomes. Conversely, the more "NARROW" is designated, the smaller the value of k1 becomes.

<Description of the Third Embodiment>

In the first and second embodiments described above, a color for which processing is desired to be set is designated from the control panel of the copier. However, this does not impose a limitation upon the invention. For example, desired processing corresponding to a desired color can be stored beforehand on an IC memory card or magnetic card. Then, by calling the relationship between the color and processing stored on the card, image reproduction similar to that of the second embodiment will be carried out.

A method of registering recognition colors and the contents of processing therefor will be described with reference to FIGS. 12A and 12B.

When the color-recognition registration key 140 is pressed, a message calling for insertion of an IC memory card into a card insertion slot (not shown) is displayed, as indicated by screen 950 in FIG. 12A. The CPU section 308 waits for insertion of the card in the slot, automatically reads in the data (recognition colors and contents of processing) stored on the card, and sets this data in the color recognition unit 304. At this time, screen 951 is displayed.

For the writing of data onto the card, a write key 146 is provided. Pressing this key starts the writing operation. At this time the screen 950 is displayed. By inserting the card into the card insertion slot (not shown), the screen 952 is displayed and the data registered by this embodiment is transferred to the card and stored there.

In accordance with this embodiment, as described above, processing desired by the user is set with respect to a color, and thus various types of processing can be set on an original. In addition, various types of processing can be freely combined and set in a readily understandable manner. This lightens the burden on the operator.

Thus, in accordance with the present invention as described above, a portion on an original that is to be subjected to processing is merely designated by the operator according to color, thereby making it possible to an image subjected to the desired processing.

In particular, since the designation is made by the desired color in the image of the original, the operator can tell at a glance which type of color processing has been designated for application to which area.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   setting means which permit setting, in correspondence with each of plural colors, at least one image processing function from among plural different image processing functions;
   recognition means for recognizing a color of an input image; and
   decision means for deciding on an image processing function for said input image on the basis of said recognized color and on the basis of an image processing function set in correspondence to said recognized color by said setting means;
   wherein said setting means includes:
   designating means for designating a position on an original;
   reading means for reading the original image at the designated position; and
   selecting means for selecting one image processing function to be applied to the color of the image read by said reading means.

2. The apparatus according to claim 1, wherein said setting means includes:
   display means for displaying a list of colors to be set; and
   first selecting means for selecting one color from the list of colors displayed by said display means.

3. The apparatus according to claim 1, wherein said setting means includes:
   an IC memory card for storing colors and the image processing functions available for each color; and
   reading means for reading contents stored on said IC memory card.

4. The apparatus according to claim 1, wherein said setting means includes means for setting an upper-limit value and a lower-limit value of a color to be set.

5. An image processing apparatus comprising:
   memory means for storing a plurality of colors and for storing at least one of a plurality of different image processing functions corresponding to each of said plurality of colors;
   designating means for designating a desired color in said memory means;
   decision means for deciding on an image processing function on the basis of said desired color and on the basis of an image processing function stored in correspondence to said desired color; and
   processing means for processing an area of said desired color on an input image based on the image processing function decided by said decision means; and
   registration means for registering, in said memory means, said colors and said image processing function corresponding to said color, wherein said registration means includes position designating means for designating the designated position on the original, reading means for reading the original image at the designated positions, and selecting means for selecting one image processing function to be applied to the color of the image read by said reading means.

6. The apparatus according to claim 5, wherein said memory means includes an IC memory card.

7. The apparatus according to claim 5, further comprising a plurality of keys corresponding to sets of colors and image processing functions corresponding to each of the colors stored in said memory means, wherein said designating means makes a designation in response to pressing of a desired key among said plurality of keys.

8. The apparatus according to claim 5, further comprising setting means for setting an upper-limit value and a lower-limit value of a color to be designated.

9. An image processing apparatus comprising:
   setting means which permit setting, in correspondence with each of plural colors, at least one image processing function from among plural different image processing functions;
   recognition means for recognizing a color of an input image; and
   decision means for deciding on an image processing function for said input image on the basis of said recognized color and on the basis of an image processing function set in correspondence to said recognized color by said setting means;
   wherein said setting means sets a color of a frame which identifies an image to be processed, a type of processing of said image, and information whether or not the image of the frame is included in the image to be processed.

10. The apparatus according to claim 5 wherein said memory means stores a plurality of colors of frames, types of processing corresponding to these colors and information whether or not images of said frames are to be processed.

11. An image processing apparatus comprising:

first setting means for setting a different image processing function corresponding to each of plural colors;

input means for inputting an image which has a portion bounded by a line of a desired color;

control means for causing the portion bounded by the line of the desired color in the image inputted by said input means to be subjected to the image processing function that corresponds to the same color as the color of the line; and second setting means for setting information to designate whether or not a frame image portion of said desired color is included in image processing by said control means.

12. An image processing apparatus comprising:

a plurality of image processing means, each for changing a shape of a color image, each of said plurality of image processing means changing the shape of the color image differently from others of said plurality of image processing means;

input means for inputting a color image;

recognizing means for recognizing a color in the color image input by said input means; and selecting means for selecting one of said plurality of image processing means based on the color recognized by said recognizing means.

13. The apparatus according to claim 12, wherein one of said plurality of image processing means is comprised by mirror-image processing means for changing a shape of a color image by generating a mirror image from the color image.

14. The apparatus according to claim 12, wherein one of said plurality of image processing means is comprised by slanted-image processing means for changing a shape of a color image by generating a slanted image from the color image.

15. The apparatus according to claim 12, wherein one of said plurality of image processing means is comprised by bold-image processing means for changing a shape of a color image by generating a bold image from the color image.

16. The apparatus according to claim 12, wherein one of said plurality of image processing means is comprised by bold-thinning-image processing means for changing a shape of a color image by generating one of either a bold image or a thinned image from the color image.

17. An image processing method comprising the steps of:

inputting a color image;

recognizing a color in the color image input in said inputting step; and selecting one of a plurality of image processing means based on the color recognized in said recognizing step, each of the plurality of image processing means for changing a shape of a color image, and each of the plurality of image processing means changing the shape of the color image differently from others of the plurality of image processing means.

18. The method according to claim 17, wherein one of the plurality of image processing means is comprised by a mirror-image processing means for changing a shape of a color image by generating a mirror image from the color image, and wherein said selecting step selects the mirror-image processing means.

19. The method according to claim 17, wherein one of the plurality of image processing means is comprised by slanted-image processing means for changing a shape of a color image by generating a slanted image from the color image, and wherein said selecting step selects the slanted-image processing means.

20. The method according to claim 17, wherein one of the plurality of image processing means is comprised by bold-image processing means for changing a shape of a color image by generating a bold image from the color image, and wherein said selecting step selects the bold-image processing means.

21. The method according to claim 17, wherein one of the plurality of image processing means is comprised by bold-thinning-image processing means for changing a shape of a color image by generating one of either a bold image or a thinned image from the color image, and wherein said selecting step selects the bold-thinning-image processing means.

* * * * *

UNITED STATES PATENT AND TRADEMARK OFFICE
CERTIFICATE OF CORRECTION

PATENT NO. : 5,666,207
DATED : September 9, 1997
INVENTOR(S) : HIROSHI OHMURA

It is certified that error appears in the above-identified patent and that said Letters Patent is hereby corrected as shown below: On the title page, item [56],

REFERENCES CITED

U.S. PATENT DOCUMENTS

Please insert at the beginning of the listed documents:

```
--4,538,182   8/1985   Saito, et al.....358/280
  4,707,713  11/1987   Ayata, et al.....346/140
  4,855,765   8/1989   Suzuki, et al....346/156
  4,873,570  10/1989   Suzuki, et al....358/80--
```

ABSTRACT

Line 2, delete "image processing"; and
       insert --image-- after "desired".

COLUMN 4

Line 62, "more" should read --¶ More--.

Signed and Sealed this

Twenty-first Day of April, 1998

Attest:

BRUCE LEHMAN

*Attesting Officer*     *Commissioner of Patents and Trademarks*